(12) United States Patent
Rhoads et al.

(10) Patent No.: US 8,045,749 B2
(45) Date of Patent: *Oct. 25, 2011

(54) EMBEDDING LOCATION DATA IN VIDEO

(75) Inventors: Geoffrey B. Rhoads, West Linn, OR (US); Steven W. Stewart, Tualatin, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 926 days.

This patent is subject to a terminal disclaimer.

(21) Appl. No.: 11/835,142

(22) Filed: Aug. 7, 2007

(65) Prior Publication Data

US 2008/0025561 A1    Jan. 31, 2008

Related U.S. Application Data

(63) Continuation of application No. 10/371,995, filed on Feb. 20, 2003, now Pat. No. 7,254,249, and a continuation-in-part of application No. 10/002,954, filed on Oct. 23, 2001, now Pat. No. 7,042,470, which is a continuation-in-part of application No. 09/800,093, filed on Mar. 5, 2001, now Pat. No. 7,061,510.

(60) Provisional application No. 60/284,163, filed on Apr. 16, 2001, provisional application No. 60/284,776, filed on Apr. 18, 2001, provisional application No. 60/359,041, filed on Feb. 20, 2002.

(51) Int. Cl.
*G06K 9/00* (2006.01)
*G06G 5/00* (2006.01)

(52) U.S. Cl. .................. 382/100; 345/634

(58) Field of Classification Search ............ 382/100; 345/634

See application file for complete search history.

(56) References Cited

U.S. PATENT DOCUMENTS

| | | | |
|---|---|---|---|
| 4,504,910 A | 3/1985 | Araki et al. | |
| 4,631,678 A | 12/1986 | Angermüller et al. | |
| 5,113,445 A | 5/1992 | Wang | |
| 5,214,757 A | 5/1993 | Mauney et al. | |
| 5,280,537 A | 1/1994 | Sugiyama | |
| 5,329,108 A | 7/1994 | Lamoure | |
| 5,385,371 A | 1/1995 | Izawa | |
| 5,499,294 A | 3/1996 | Friedman | |
| 5,502,576 A | 3/1996 | Ramsay et al. | |
| 5,664,018 A | 9/1997 | Leighton | |
| 5,764,770 A | 6/1998 | Schipper et al. | |
| 5,799,082 A | 8/1998 | Murphy et al. | |
| 5,812,962 A | 9/1998 | Kovac | |
| 5,822,436 A | 10/1998 | Rhoads | |
| 5,825,892 A | 10/1998 | Braudaway et al. | |

(Continued)

FOREIGN PATENT DOCUMENTS

EP    0 947 953    10/1999

(Continued)

OTHER PUBLICATIONS

Notice of Allowance (dated Dec. 17, 2004), Appeal Brief (dated Sep. 20, 2004) and Office Action (dated May 7, 2004) from parent U.S. Appl. No. 09/800,093.

(Continued)

*Primary Examiner* — John Strege

(57) ABSTRACT

Digital watermarking or steganographic data hiding is used to convey location data in video. A digital watermark or steganographic signal may associate geovector or geolocation information with video, video objects or areas depicted in the video. Other implementations and combinations are provided as well.

14 Claims, 4 Drawing Sheets

U.S. PATENT DOCUMENTS

| | | |
|---|---|---|
| 5,861,841 A | 1/1999 | Gildea et al. |
| 5,864,623 A | 1/1999 | Messina et al. |
| 5,875,249 A | 2/1999 | Mintzer et al. |
| 5,889,868 A | 3/1999 | Moskowitz et al. |
| 5,889,898 A | 3/1999 | Koren et al. |
| 5,901,178 A | 5/1999 | Lee et al. |
| 5,919,730 A | 7/1999 | Gasper et al. |
| 5,943,422 A | 8/1999 | Van Wie et al. |
| 5,958,051 A | 9/1999 | Renaud et al. |
| 5,964,821 A | 10/1999 | Brunts et al. |
| 5,987,136 A | 11/1999 | Schipper et al. |
| 5,990,826 A | 11/1999 | Mitchell |
| 5,995,681 A | 11/1999 | Lee et al. |
| 6,005,936 A | 12/1999 | Shimizu |
| 6,031,914 A | 2/2000 | Tewfik et al. |
| 6,081,827 A | 6/2000 | Reber et al. |
| 6,088,394 A | 7/2000 | Maltby |
| 6,122,403 A | 9/2000 | Rhoads |
| 6,130,741 A | 10/2000 | Wen et al. |
| 6,148,091 A | 11/2000 | DiMaria |
| 6,175,639 B1 | 1/2001 | Satoh et al. |
| 6,181,802 B1 | 1/2001 | Todd |
| 6,185,312 B1 | 2/2001 | Nakamura et al. |
| 6,205,249 B1 | 3/2001 | Moskowitz |
| 6,243,480 B1 | 6/2001 | Zhao et al. |
| 6,246,777 B1 | 6/2001 | Agarwal et al. |
| 6,249,226 B1 | 6/2001 | Harrison |
| 6,263,438 B1 | 7/2001 | Walker et al. |
| 6,282,362 B1 | 8/2001 | Murphy et al. |
| 6,282,648 B1 | 8/2001 | Walker et al. |
| 6,289,453 B1 | 9/2001 | Walker |
| 6,301,360 B1 | 10/2001 | Bocionek et al. |
| 6,310,956 B1 | 10/2001 | Morito et al. |
| 6,311,214 B1 | 10/2001 | Rhoads |
| 6,320,829 B1 | 11/2001 | Matsumoto et al. |
| 6,324,573 B1 | 11/2001 | Rhoads |
| 6,332,149 B1 | 12/2001 | Warmus et al. |
| 6,332,193 B1 | 12/2001 | Glass et al. |
| 6,341,350 B1 | 1/2002 | Miyahara et al. |
| 6,343,138 B1 | 1/2002 | Rhoads |
| 6,351,439 B1 | 2/2002 | Miwa et al. |
| 6,389,151 B1 | 5/2002 | Carr et al. |
| 6,401,206 B1 | 6/2002 | Khan et al. |
| 6,408,082 B1 | 6/2002 | Rhoads et al. |
| 6,408,331 B1 | 6/2002 | Rhoads |
| 6,411,725 B1 | 6/2002 | Rhoads |
| 6,418,232 B1 | 7/2002 | Nakano et al. |
| 6,427,020 B1 | 7/2002 | Rhoads |
| 6,448,979 B1 | 9/2002 | Schena |
| 6,463,416 B1 | 10/2002 | Messina |
| 6,493,514 B1 | 12/2002 | Stocks et al. |
| 6,496,802 B1 | 12/2002 | van Zoest |
| 6,498,984 B2 | 12/2002 | Agnew et al. |
| 6,504,571 B1 | 1/2003 | Narayanaswami et al. |
| 6,505,160 B1 | 1/2003 | Levy et al. |
| 6,512,835 B1 | 1/2003 | Numao |
| 6,522,770 B1 | 2/2003 | Seder et al. |
| 6,526,155 B1 | 2/2003 | Wang et al. |
| 6,529,615 B2 | 3/2003 | Hendrickson et al. |
| 6,532,541 B1 | 3/2003 | Chang et al. |
| 6,542,927 B2 | 4/2003 | Rhoads |
| 6,556,688 B1 | 4/2003 | Ratnakar |
| 6,614,914 B1 | 9/2003 | Rhoads et al. |
| 6,625,297 B1 | 9/2003 | Bradley |
| 6,636,249 B1 | 10/2003 | Rekimoto |
| 6,650,761 B1 | 11/2003 | Rodriguez et al. |
| 6,664,976 B2 | 12/2003 | Lofgren et al. |
| 6,829,430 B1 | 12/2004 | Ashizaki et al. |
| 6,847,883 B1 | 1/2005 | Walmsley et al. |
| 6,947,571 B1 | 9/2005 | Rhoads et al. |
| 6,950,519 B2 | 9/2005 | Rhoads |
| 6,993,152 B2 | 1/2006 | Patterson et al. |
| 7,027,612 B2 | 4/2006 | Patterson et al. |
| 7,042,470 B2 | 5/2006 | Rhoads et al. |
| 7,061,510 B2 | 6/2006 | Rhoads |
| 7,084,903 B2 | 8/2006 | Narayanaswami et al. |
| 7,088,843 B2 | 8/2006 | Pelly |
| 7,098,931 B2 | 8/2006 | Patterson et al. |
| 7,099,492 B2 | 8/2006 | Rhoads |
| 7,111,168 B2 | 9/2006 | Lofgren et al. |
| 7,184,572 B2 | 2/2007 | Rhoads et al. |
| 7,197,160 B2 | 3/2007 | Rhoads et al. |
| 7,254,249 B2 | 8/2007 | Rhoads et al. |
| 7,502,489 B2 | 3/2009 | Rhoads |
| 7,502,490 B2 | 3/2009 | Rhoads et al. |
| 7,650,008 B2 | 1/2010 | Rhoads |
| 2001/0001854 A1 | 5/2001 | Schena et al. |
| 2001/0019611 A1 | 9/2001 | Hilton |
| 2001/0022667 A1 | 9/2001 | Yoda |
| 2001/0023421 A1 | 9/2001 | Numao et al. |
| 2001/0026377 A1 | 10/2001 | Ikegami |
| 2001/0026616 A1 | 10/2001 | Tanaka |
| 2001/0026629 A1 | 10/2001 | Oki |
| 2001/0030759 A1 | 10/2001 | Hayashi et al. |
| 2001/0031064 A1 | 10/2001 | Donescu et al. |
| 2001/0033674 A1 | 10/2001 | Chen et al. |
| 2001/0034835 A1 | 10/2001 | Smith |
| 2001/0039546 A1 | 11/2001 | Moore et al. |
| 2001/0046307 A1 | 11/2001 | Wong |
| 2001/0051964 A1 | 12/2001 | Warmus et al. |
| 2002/0001395 A1 | 1/2002 | Davis et al. |
| 2002/0002679 A1 | 1/2002 | Murakami et al. |
| 2002/0006212 A1 | 1/2002 | Rhoads et al. |
| 2002/0009209 A1 | 1/2002 | Inoue et al. |
| 2002/0044690 A1 | 4/2002 | Burgess |
| 2002/0046178 A1 | 4/2002 | Morito et al. |
| 2002/0057340 A1 | 5/2002 | Fernandez |
| 2002/0059520 A1 | 5/2002 | Murakami et al. |
| 2002/0065844 A1 | 5/2002 | Robinson |
| 2002/0069370 A1 | 6/2002 | Mack et al. |
| 2002/0075298 A1 | 6/2002 | Schena et al. |
| 2002/0080396 A1 | 6/2002 | Silverbrook et al. |
| 2002/0095586 A1 | 7/2002 | Doyle et al. |
| 2002/0095601 A1 | 7/2002 | Hind et al. |
| 2002/0106105 A1 | 8/2002 | Pelly et al. |
| 2002/0122564 A1 | 9/2002 | Rhoads et al. |
| 2002/0124171 A1 | 9/2002 | Rhoads |
| 2002/0124173 A1 | 9/2002 | Stone |
| 2002/0126869 A1 | 9/2002 | Wang et al. |
| 2002/0135600 A1 | 9/2002 | Rhoads et al. |
| 2002/0136531 A1 | 9/2002 | Harradine |
| 2002/0147910 A1 | 10/2002 | Brundage et al. |
| 2002/0159765 A1 | 10/2002 | Maruyama et al. |
| 2002/0168069 A1 | 11/2002 | Tehranchi et al. |
| 2002/0191810 A1 | 12/2002 | Fudge et al. |
| 2003/0011684 A1 | 1/2003 | Narayanaswami |
| 2003/0012562 A1 | 1/2003 | Lawandy et al. |
| 2003/0032033 A1 | 2/2003 | Anglin et al. |
| 2003/0040326 A1 | 2/2003 | Levy et al. |
| 2003/0048908 A1 | 3/2003 | Hamilton |
| 2003/0053654 A1 | 3/2003 | Patterson et al. |
| 2003/0063319 A1 | 4/2003 | Umeda et al. |
| 2003/0069693 A1 | 4/2003 | Snapp et al. |
| 2003/0074556 A1 | 4/2003 | Chapman et al. |
| 2003/0083098 A1 | 5/2003 | Yamazaki et al. |
| 2003/0090690 A1 | 5/2003 | Katayama et al. |
| 2003/0215110 A1 | 11/2003 | Rhoads et al. |
| 2004/0005078 A1 | 1/2004 | Tillotson |
| 2004/0046774 A1 | 3/2004 | Rhoads |
| 2004/0162981 A1 | 8/2004 | Wong |
| 2004/0201676 A1 | 10/2004 | Needham |
| 2004/0221244 A1 | 11/2004 | Baldino |
| 2005/0086585 A1 | 4/2005 | Robert et al. |
| 2005/0276440 A1 | 12/2005 | Rhoads et al. |
| 2006/0072783 A1 | 4/2006 | Rhoads |
| 2007/0052730 A1 | 3/2007 | Patterson et al. |
| 2007/0116325 A1 | 5/2007 | Rhoads et al. |
| 2008/0025561 A1 | 1/2008 | Rhoads et al. |
| 2008/0080737 A1 | 4/2008 | Rhoads et al. |
| 2009/0238403 A1 | 9/2009 | Rhoads et al. |
| 2010/0067734 A1 | 3/2010 | Rhoads |

FOREIGN PATENT DOCUMENTS

| | | |
|---|---|---|
| EP | 0 953 938 | 11/1999 |
| EP | 935 872 | 11/2001 |
| EP | 1220152 | 7/2002 |
| GB | 2371934 | 8/2002 |

| | | |
|---|---|---|
| JP | 2000 41144 | 2/2000 |
| WO | WO99/17537 | 4/1999 |
| WO | WO 01/05075 | 1/2001 |
| WO | WO01/24113 | 4/2001 |
| WO | WO01/39121 | 5/2001 |
| WO | WO01/76253 | 10/2001 |
| WO | WO02/03328 | 1/2002 |
| WO | WO02/33650 | 4/2002 |

OTHER PUBLICATIONS

Notice of Allowance (dated Dec. 17, 2004), Appeal Brief (dated Sep. 20, 2004) and Office Action (dated May 14, 2004) from assignee's U.S. Appl. No. 10/002,954.

Bender et al., "Techniques for Data Hiding," SPIE vol. 2420, Jan. 1995, pp. 164-173.

Carp, "Seven wonders of the imaging world", International Contact, Oct./Nov. 2000, pp. 36/I-36/IV.

"Digital Watermarking, The Unseen Advantage," Geo Informatics, Jun. 2001 (3 pages). Friedman, "The Trustworthy Digital Camera: Restoring Credibility to the Photographic Image," IEEE Transactions on Consumer Electronics, vol. 39, No. 4, Nov. 1993, pp. 905-910.

http://web.archive.org/web/20010305033241/http://www.kodak.com/country/US/-en/corp/researchDevelopment/technology-Features/digitalWatermarking.shtml, "Invisible Watermarking", archive date of Mar. 5, 2001 (4 pages, including Internet Archive Wayback Machine cover page).

Koch et al., "Digital Copyright Labeling: Providing Evidence of Misuse and Tracking Unauthorized Distribution of Copyrighted Materials," OASIS Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180-187.

Seybold Seminars: Keynote: Digital Imaging Day, comments from panel including Daniel Carp, panel discussion occurring on Aug. 28, 2000 (8 pages).

Yeung et al., "Digital Watermarks: Shedding Light on the Invisible," Nov.-Dec. 1998, IEEE Micro vol. 18, No. 6, pp. 32-41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao, "Digital Watermark Mobile Agents," Proc. of NISSC'99, Arlington, VA, Oct. 18-21, 1999, pp. 138-146.

Aug. 30, 2006 Amendment, Aug. 23, 2006 Office Action, and Nov. 13, 2006 Office Action, each from Assignee's U.S. Appl. No. 10/423,489 (published as US 2004-0046774 A1).

EMBEDDING LOCATION DATA IN VIDEO

RELATED APPLICATION DATA

This application is a continuation of U.S. patent application Ser. No. 10/371,995 (now U.S. Pat. No. 7,254,249), which claims the benefit of U.S. Provisional Patent Application No. 60/359,041, filed Feb. 20, 2002. The Ser. No. 10/371,995 application is also a continuation-in-part of U.S. patent application Ser. No. 10/002,954, filed Oct. 23, 2001 (now U.S. Pat. No. 7,042,470), which is a continuation-in-part of U.S. patent application Ser. No. 09/800,093, filed Mar. 5, 2001 (now U.S. Pat. No. 7,061,510). The 10/002,954 application also claims the benefit of U.S. Provisional Application Nos. 60/284,163, filed Apr. 16, 2001, 60/284,776, filed Apr. 18, 2001. The present application is also related to U.S. patent application Ser. No. 09/833,013 (now U.S. Pat. No. 7,249,257). Each of the above patent applications is hereby incorporated herein by reference.

FIELD OF THE INVENTION

The present invention relates to digitally watermarking video and images, and is particularly illustrated in the context of video captured from aerial platforms.

BACKGROUND AND SUMMARY OF THE INVENTION

Acquisition of aerial imagery traces its history back to the Wright brothers, and is now commonly performed from satellite and space shuttle platforms, in addition to aircraft.

While the earliest aerial imagery relied on conventional film technology, a variety of electronic sensors are now more commonly used. Some collect image data corresponding to specific visible, UV or IR frequency spectra (e.g., the Multi-Spectral Scanner and Thematic Mapper used by the Landsat satellites). Others use wide band sensors. Still others use radar or laser systems (sometimes stereo) to sense topological features in 3 dimensions. Some satellites can even collect ribbon imagery (e.g., a raster-like, 1-dimensional terrestrial representation, which is pieced together with other such adjacent ribbons).

The quality of the imagery has also constantly improved. Some satellite systems are now capable of acquiring image and topological data having a resolution of less than a meter. Aircraft imagery, collected from lower altitudes, provides still greater resolution.

Such imagery can be used to develop maps or models, such as Digital Elevation Models (DEM) and others. DEM, essentially, is an "elevation map" of the earth (or part thereof). One popular DEM is maintained by the U.S. Geological Survey and details terrain elevations at regularly spaced intervals over most of the U.S. More sophisticated DEM databases are maintained for more demanding applications, and can consider details such as the earth's pseudo pear shape, in addition to more localized features. Resolution of sophisticated DEMs can get well below one meter cross-wise, and down to centimeters or less in actual elevation. DEMs—with their elevation data—are sometimes supplemented by albedo maps (sometimes termed texture maps, or reflectance maps) that detail, e.g., a grey scale value for each pixel in the image, conveying a photographic-like representation of an area.

(There is a large body of patent literature that illustrates DEM systems and technology. For example: U.S. Pat. No. 5,608,405 details a method of generating a Digital Elevation Model from the interference pattern resulting from two co-registered synthetic aperture radar images. U.S. Pat. No. 5,926,581 discloses a technique for generating a Digital Elevation Model from two images of ground terrain, by reference to common features in the two images, and registration-mapping functions that relate the images to a ground plane reference system. U.S. Pat. Nos. 5,974,423, 6,023,278 and 6,177,943 disclose techniques by which a Digital Elevation Model can be transformed into polygonal models, thereby reducing storage requirements, and facilitating display in certain graphics display systems. U.S. Pat. Nos. 5,995,681 and 5,550,937 detail methods for real-time updating of a Digital Elevation Model (or a reference image based thereon), and are particularly suited for applications in which the terrain being mapped is not static but is subject, e.g., to movement or destruction of mapped features. The disclosed arrangement iteratively cross-correlates new image data with the reference image, automatically adjusting the geometry model associated with the image sensor, thereby accurately co-registering the new image relative to the reference image. Areas of discrepancy can be quickly identified, and the DEM/reference image can be updated accordingly. U.S. Pat. No. 6,150,972 details how interferometric synthetic aperture radar data can be used to generate a Digital Elevation Model. Each of these patents is herein incorporated by reference.).

From systems such as the foregoing, and others, a huge quantity of aerial imagery is constantly being collected. Management and coordination of the resulting large data sets is a growing problem. Integrating the imagery with related, often adjacent, imagery, and efficiently updating "stale" imagery is also a problem.

In accordance with one aspect of the present invention, digital watermarking technology is employed to help track such imagery, and can also provide audit trail, serialization, anti-copying, and other benefits.

In accordance with another aspect of the invention, video imagery is embedded to include location information. The location information may include or point to a so-called "geovector."

The foregoing and additional features and advantages of the present invention will be more readily apparent from the following detailed description with reference to the following figures.

DETAILED DESCRIPTION

For expository convenience, the following section focuses on satellite and aerial "imagery" to illustrate the principles of the invention. The principles of the invention, however, are equally applicable to other forms of aerial surveillance data and other topographic/mapping information. Accordingly, the term "image" should be used to encompass all such other data sets, and the term "pixel" should be construed to encompass component data from such other data sets.

When new aerial imagery is received, it is generally necessary to identify the precise piece of earth to which it corresponds. This operation, termed "georeferencing" or "geocoding," can be a convoluted art and science.

In many systems, the georeferencing begins with a master reference system (e.g., latitude and longitude) that takes into account the earth's known deformities from a sphere. Onto this reference system the position of the depicted region is inferred, e.g., by consideration of the satellite's position and orientation (ephemeris data), optical attributes of the satellite's imaging system (e.g., resolution, magnification, etc.), and models of the dispersion/refraction introduced by the earth's atmosphere.

In applications where precise accuracy is required, the foregoing, "ephemeris," position determination is refined by comparing features in the image with the placement of known features on the earth's surface (e.g., buildings and other man-placed objects, geological features, etc.) and compensating the georeference determination accordingly. Thus, for example, if the actual latitude and longitude of a building is known (e.g., by measurement from a ground survey—"ground truth"), and the corresponding latitude and longitude of that building as indicated in the georeferenced satellite imagery is different, the reference system applied to the satellite data can be altered to achieve a match. (Commonly, three or more such ground truth points are used so as to assure accurate correction.)

Ground-truthing is a tedious undertaking. While computer methods can be used to facilitate the process, the best ground truth correction of imagery generally requires some human involvement. This is impractical for many applications.

Figure 1:
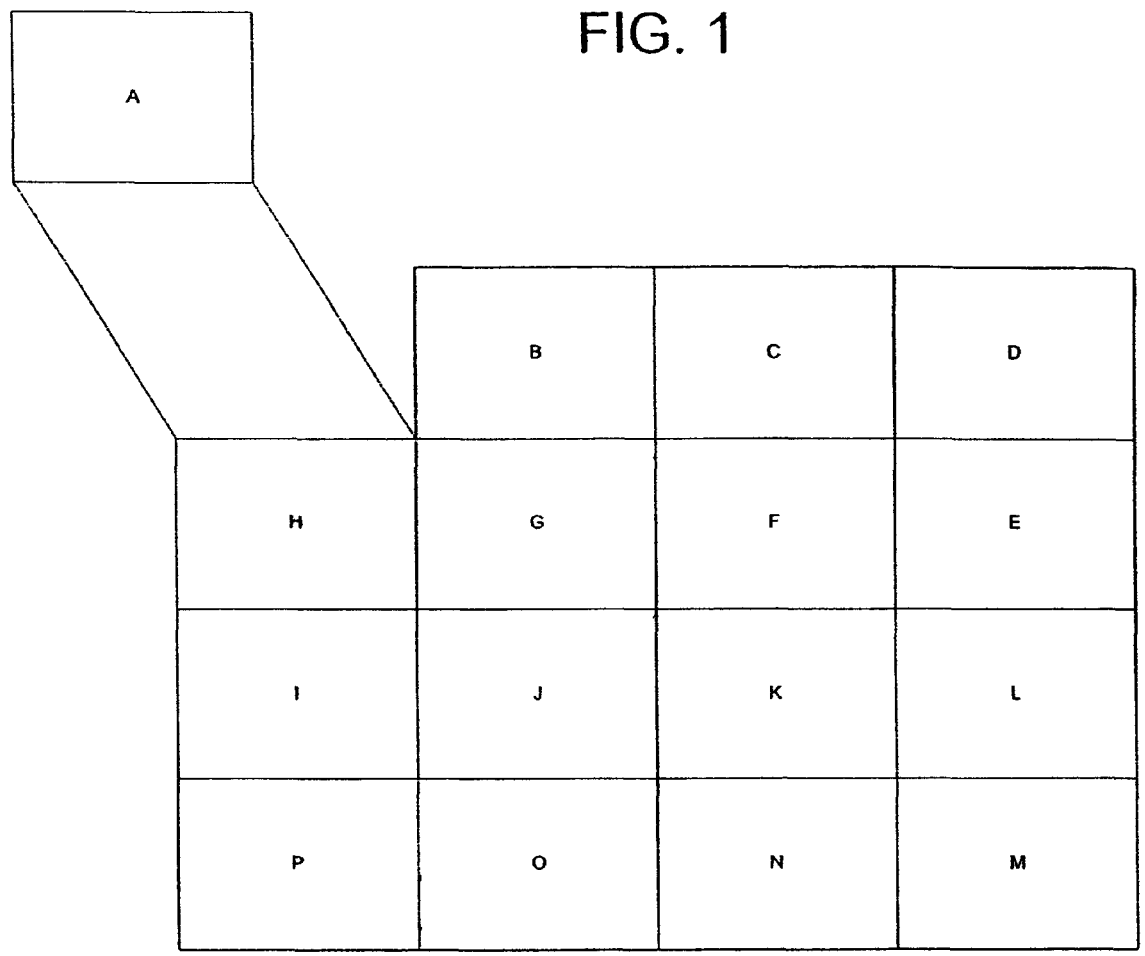
FIG. 1 illustrates imagery, which is segmented into image patches.

As shown in FIG. 1, aerial imagery can be segmented into area sets (e.g., image "patches"). These patches can be pieced together (or "composited") in a quilt-like manner to form a master map. (A "master" map is used generally herein to represent a map or other area representation, typically which will include a plurality of image patches. Image patches are defined broadly and may include image segments, photographs, separate images, etc.). An image patch may include imagery representing an area, such as a 1×1 meter area, a 1×1 kilometer area, etc. Often, an image patch is combined with adjacent patches, which were gathered on different dates. For example, an image taken last week (e.g., Patch C in FIG. 1) may be quilted together with image patches taken today (e.g., Patch B), or a year ago (e.g., Patch A), to form a larger area map. Also, patches may be replaced over time to reflect new area developments or movements. (Of course, a master map need not be physically pieced together, but may instead be electronically maintained by a computer database, which correlates the patches or stores information, e.g., coordinates, patch locations, etc.).

Similarly, image patches can be pieced together with other images taken from different aerial platforms (e.g., satellites, airplanes, unmanned aircraft, etc.) or taken with different imagery characteristics. (Imagery characteristics may include resolution, angle, scale, rotation, skew, time, azimuth, device characteristics, altitude, attitude, physical conditions such as cloud cover and magnification, etc.)

Images typically undergo auto-correlation processes to reconcile differences between adjacent patches, prior to being composited (or arranged) with other patches. A variety of known mathematical techniques can be utilized in this operation, including dot product computation, transforming to spatial frequency domain, convolution, etc. In a lay sense, the correlation can be imagined as sliding one map over the other or matching pieces in a puzzle-like fashion until the best registration between the two image patches is obtained.

Now consider a geo-referencing example. A new satellite image is acquired corresponding to part of a region represented by a master map. The particular terrain depicted by the satellite image can be inferred from ephemeris and other factors, as noted above. By such techniques, the location of the depicted image on the earth's surface (e.g., the latitude and longitude of a point at the center of the image) may be determined within an error of, say 5-500 meters. This is a gross geo-referencing operation.

Next a fine geo-referencing operation is automatically performed, as follows. An excerpt of a master map is retrieved from a database—large enough to encompass the new image and its possible placement error (e.g., an area centered on the same latitude/longitude, but extending 250 meters further at each edge). A projective image is formed from this master DEM/map excerpt, considering, e.g., the satellite's position and atmospheric effects, thereby simulating how the master map would look to the satellite, taking into account—where possible—the particular data represented by the satellite image, e.g., the frequency bands imaged, etc. (An albedo map may be back-projected on the 3D DEM data in some arrangements to augment the realism of the projective image.).

The projective image formed from the master DEM/map excerpt differs somewhat from the image actually acquired by the satellite. This difference is due, in part, to the error in the gross geo-referencing. (Other differences may arise, e.g., by physical changes in the region depicted since the master DEM/map was compiled.).

The projective image is next automatically correlated with the satellite image. From the correlation operation, the center-to-center offset between the excerpt of the master DEM/map, and the satellite image, is determined. The satellite image can thereby be accurately placed in the context of the master map. Depending on system parameters, a fine placement accuracy of, e.g., between 5 cm and 5 meters (i.e., sub-pixel accuracy) may be achieved.

(In some embodiments, affine transformations can be applied to the image data to further enhance the correlation. E.g., particular geological or other features in the two data sets can be identified, and the satellite data (e.g., map or image) can then be affine-transformed so that these features correctly register.).

With the satellite image thus finely geo-referenced to the master DEM/map, it can be transformed (e.g., resampled) as necessary to correspond to the (typically rectilinear) reference system used in the master map, and then used to refine the data represented in the map. Buildings or other features newly depicted in the satellite image, for example, can be newly represented in the master map. The master map can be similarly updated to account for erosion and other topological changes revealed by the new satellite image.

In one embodiment, the finely geo-referenced satellite data is segmented into region or area sets, e.g., rectangular patches corresponding to terrain 1000 meters on a side, and each patch is given its own weighting factor, etc. In a system with 10 meter resolution (i.e., a pixel size of 10 m$^2$, the patch thus comprises an array of 100×100 pixels. (In some embodiments, the fine geo-referencing is done following the segmentation of the image, with each patch separately correlated with a corresponding area in the master map.) Each patch may take the form of a separate data file.

When the new satellite data is added to update the master map, old data may be discarded so that it no longer influences the map. Consider an area that is imaged monthly by a satellite. Several months' worth of image data may be composited to yield the master map (e.g., so cloud cover that obscured a region in the latest fly-over does not leave part of the map undefined). As each component image data gets older, it may be given less and less weight, until it no longer forms any part of the master map. (Other component data, in contrast, may be retained for much longer periods of time. Map information collected by ground surveys or other forms of "ground truth" information may fall into this category.).

The master map may be physically maintained in different ways. In one exemplary arrangement, a database stores the ten sets of data (e.g., acquired from different sources, or at different times) for each 1000×1000 meter patch. When interrogated to produce a map or other data, the database recalls the 10 data sets for each patch, and combines them on the fly according to associated weighting factors and other criteria (e.g., viewing angle) to yield a net representation for that patch. This composite patch is then combined (e.g., graphically stitched) with other adjoining, similarly formed composite patches, to yield a data set representing the desired area.

In another embodiment, the component sets of image data are not separately maintained. Rather, each new set of image data is used to update a stored map. If the new image data is of high quality (e.g., good atmospheric seeing conditions, and acquired with a high resolution imaging device), then the new data may be combined with the existing map with a 20/80 weighting (i.e., the existing map is given a weight four-times that of the new data). If the new image data is of low quality, it may be combined with the existing map with a 5/95 weighting. The revised map is then stored, and the new data needn't thereafter be tracked.

(The foregoing examples are simplifications, but serve to illustrate a range of approaches.)

The former arrangement—with the component data stored—is preferred for many applications, since the database can be queried to yield different information. For example, the database can be queried to generate a synthesized image of terrain, as it would look at a particular time of day, imaged in a specified IR frequency band, from a specified vantage point.

It will be recognized that a key requirement—especially of the former arrangement—is a sophisticated data management system. For each data set representing a component 1000× 1000 meter patch stored in the database, a large quantity of ancillary data (meta data) must be tracked. Among this meta data may be a weighting factor (e.g., based on seeing conditions and sensor attributes), an acquisition date and time (from which an age-based weighting factor may be determined), the ID of the sensor/satellite that acquired that data, ephemeris data from the time of acquisition, the frequency band imaged, the geo-referenced position of the patch (e.g., latitude/longitude), etc., etc. (Much of this data may be common to all patches from a single image.).

Classically, each component source of data to the system (here referred to as an "image" for expository convenience) is associated with a unique identifier. Tapes and data files, for example, may have headers in which this identifier is stored. The header may also include all of the meta data that is to be associated with that file. Or the identifier can identify a particular database record at which the corresponding meta data is stored. Or hybrid approaches can be used (e.g., the header can include a file identifier that identifies a data base record, but also includes data specifying the date/time of data acquisition).

In the final analysis, any form of very reliable image identification may suffice for use in such a system. The header approach just discussed is straightforward. Preferable, however, is to embed one or more identifiers directly into the image data itself (i.e., "in band" steganographic encoding using digital watermarking). A well-designed watermarking name-space can in fact become a supra-structure over several essentially independent serial numbering systems already in use across a range of satellite sources. Moreover, rudimentary georeferencing information can actually be embedded within the watermark name-space.

For example, on initial acquisition, an initial digital watermark can be applied to satellite imagery detailing the ephemeris based gross georeferencing. Once the image has been finely georeferenced, the existing watermark can either be overlaid or overwritten with a new watermark containing the georeferencing information (e.g., "center lat: N34.432-4352, long: W87.2883134; rot from N/S: 3.232; x2.343, y2.340, dx0.123, dy493, etc."). These numbers essentially encode georeferencing information including projective and atmospheric distortions, such that when this image is corrected, high accuracy should be achieved.

The assignee's U.S. Pat. No. 6,122,403, and pending U.S. patent application Ser. No. 09/503,881 (now U.S. Pat. No. 6,614,914), detail suitable digital watermarking techniques in which values of pixels, e.g., in a 100×100 pixel patch, can be slightly altered so as to convey a plural-bit payload, without impairing use of the pixel data for its intended purpose. (This patent and patent application are herein incorporated by reference.). The payload may be on the order of 50-250 bits, depending on the particular form of encoding (e.g., convolution, turbo, or BCH coding can be employed to provide some error-correcting capability), and the number of bits per pixel. Larger payloads can be conveyed through larger image patches. (Larger payloads can also be conveyed by encoding the information is a less robust fashion, or by making the encoding more relatively visible.). The watermark payload can convey an image identifier, and may convey other meta data as well. In some systems, the component image files are tagged both by digital watermark identifiers and also by conventional out-of-band techniques, such as header data, thereby affording data redundancy. Of course, there are many watermarking techniques known to those skilled in the art, and such may be suitably interchanged with the above-cited patent documents.

Watermarking may be performed in stages, at different times. For example, an identifier can be watermarked into an image relatively early in the process, and other information (such as finely geo-referenced latitude/longitude) can be watermarked later. A single watermark can be used, with different payload bits written at different times. (In watermark systems employing pseudo-random data or noise (PN), e.g., to randomize some aspect of the payload's encoding, the same PN data can be used at both times, with different payload bits encoded at the different times.)

Alternatively, different watermarks can be applied to convey different data. The watermarks can be of the same general type (e.g., PN based, but using different PN data). Or different forms of watermark can be used (e.g., one that encodes by adding an overlay signal to a representation of the image in the pixel domain, another that encodes by slightly altering DCT coefficients corresponding to the image in a spatial frequency domain, and another that encodes by slightly altering wavelet coefficients corresponding to the image. Of course, other watermarking techniques may be used as suitable replacements for those discussed above.).

In some multiple-watermarking approaches, a first watermark is applied before the satellite image is segmented into patches. A later watermark can be applied after segmentation. (The former watermark is typically designed so as to be detectable from even small excerpts of the original image.)

A watermark can be even applied by the imaging instrument. In some embodiments, the image is acquired through an LCD optical shutter, or other programmable optical device, that imparts an inconspicuous patterning to the image as it is captured. (One particular optical technique for watermark encoding is detailed in U.S. Pat. No. 5,930,369, which is herein incorporated by reference.). Or the watermarking can be effected by systems in the satellite (or other aerial platform) that process the acquired data prior to transmission to a ground station. In some systems, the image data is compressed for transmission—discarding information that is not important. The compression algorithm can discard information in a manner calculated so that the remaining data is thereby encoded with a watermark.

The ground station receiving the satellite transmission can likewise apply a watermark to the image data. So can each subsequent system through which the data passes.

As indicated, the watermark(s) can identify the imaging system, the date/time of data acquisition, satellite ephemeris data, the identity of intervening systems through which the data passed, etc. One or more watermarks can stamp the image with unique identifiers used in subsequent management of the image data, or in management of meta data associated with the image.

A watermark can also serve a function akin to a hyperlink, e.g., as detailed in U.S. patent application Ser. No. 09/571,422, which is herein incorporated by reference. For example, a user terminal can permit an operator to right-click on a region of interest in a displayed image. In response, the system can respond with a menu of options—one of which is Link Through Watermark(s). If the user selects this option, a watermark detection function is invoked that decodes a watermark payload from the displayed image (or from a portion of the image in which the operator clicked). Using data from the decoded watermark payload, the terminal interrogates a database for a corresponding record. That record can return to the terminal certain stored information relating to the displayed image. For example, the database can present on the terminal screen a listing of hyperlinks leading to other images depicting the same area. By clicking on such a link, the corresponding image is displayed. Or the database can present, on the user terminal screen, the meta-data associated with the image.

In some embodiments, watermarks in component images may carry-through into the master DEM/map representation. If an excerpt of the master DEM/map is displayed, the user may invoke the Link Through Watermark(s) function. Corresponding options may be presented. For example, the user may be given the option of viewing each of the component images/data sets that contributed to the portion of the master map being viewed.

(It will be recognized that a variety of user interface techniques other than right-clicking, and selecting from a menu of options thereby displayed, can be employed. That interface is illustrative only.)

In some embodiments, a watermark can be applied to each DEM/map from the master database as it is retrieved and output to the user. The watermark can indicate (i.e., by direct encoding, or by pointing to a database record) certain data related to the compiled data set, such as the date/time of creation, the ID of the person who queried the database, the component datasets used in preparing the output data, the database used in compiling the output data, etc. Thereafter, if this output data is printed, or stored for later use, the watermark persists, permitting this information to be later ascertained.

Correlating Images with Watermarks

Figure 2A:
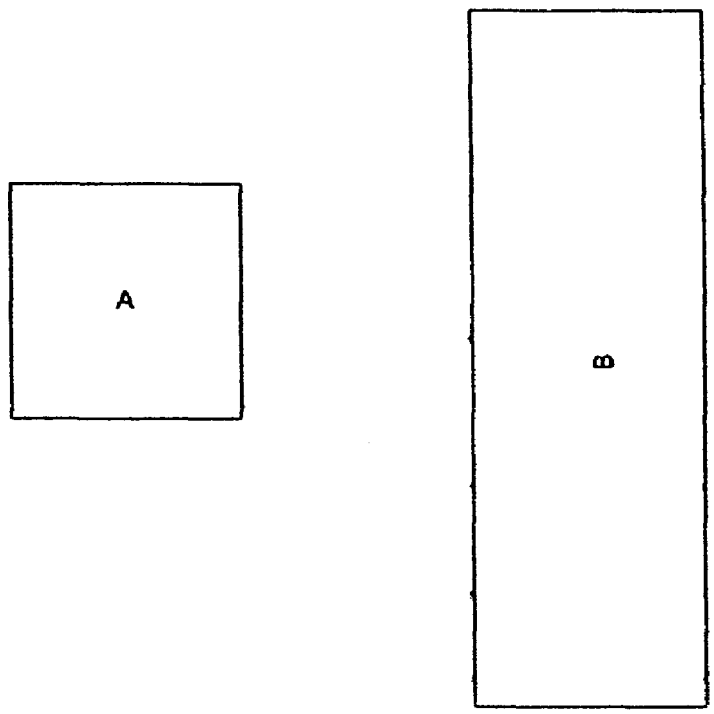
FIGS. 2a and 2b illustrate a correlation of image patches.
Figure 2B:
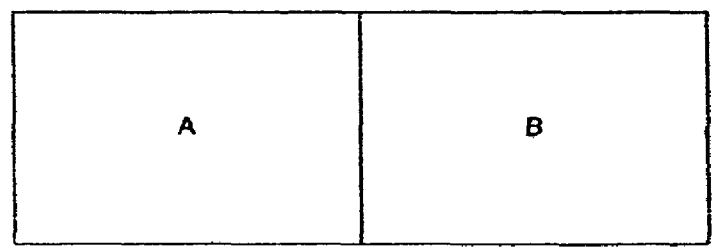

With reference to FIGS. 2a and 2b, watermarks can assist in correction or correlating imagery characteristics (e.g., such as scale, rotation, resolution, skew, time-matching, etc.). For example, an embedded watermark payload may indicate the angle of the imaging device (e.g., optical camera, imaging sensor, etc.), the height to the imaging device, the relative position (e.g., skew, rotation, etc.) of the device with respect to a target area, and the resolution of the device and image. (Such measurements can be provided from sensing and positioning equipment on board or in communication with the aerial platform. Such characteristics may be alternatively determined by the georeferencing techniques discussed above. Of course, other imagery characteristic determining techniques may be suitably interchanged with the present invention.). Returning to FIGS. 2a and 2b, imagery characteristics provide information to help manipulate patches A and B (FIG. 2a) into a standardized or compatible format (FIG. 2b). Information pertaining to the imaging characteristics can be used to improve and expedite the auto-correlation processes discussed above. In addition, once the imaging characteristics are known, straightforward processing can manipulate an image patch to conform to adjacent patches (or to the map itself). For example, some or all of the patches in a master map are mathematically manipulated to achieve the same scale, orientation, and/or resolution.

With respect to a watermark payload, the imaging characteristics can be directly encoded as the watermark payload. Alternatively, an index (or identifier) associated with a set of these characteristics may be encoded in the payload. To illustrate, a numerical code or index represents a set possible imagery characteristics (or a subset of such). The imagery characteristics are stored in a data base record. The code or index, once extracted from a watermark, is used to interrogate a database to obtain the corresponding data record. (As an alternative, a payload signifies a predetermined set of values, e.g., a payload of 1237 signifies a predetermined scale, rotation, skew, etc. Or the index relates to a predetermined range of characteristics. For example, the range may specify that the scale is in a particular range, or that the resolution falls within a range, etc.). A watermark payload size and complexity can be reduced with a database/index system.

Embedding imagery characteristic in the form of a digital watermark assists in downstream processing and handling of an image. An automated-quilting process can be employed to match patches according to the georeferencing and/or imagery characteristics provided by a digital watermark. These georeferencing and/or imagery characteristics can also serve to preserve the historic information about the image and depicted area. Individual patches can also be watermarked to include coordinates or master map locators. With reference to FIG. 1, patch E may include coordinates or a plurality of coordinates that identify its master map location, coordinates for corners or edges (e.g., either physical geo-coordinates or coordinates relative to its master map location), or its relationship with adjacent patches. Such a locator can be added once a master map is composited (e.g., by watermarking the master map). Alternatively, such locators can be embedded before quilting, such as when imagery is collected or processed.

A time-tag (or stamp) may also be embedded in imagery. The time-tag can be used to categorize images based on time (e.g., hour, minutes, date, etc.), and to help identify stale or outdated imagery. The time-tag may optionally include a plurality of fields, such as time-taken, time processed, time integrating in a master map, etc. Such time-tagging methods improve management of images. (In one embodiment, an automated process searches a master map database, looking for stale or outdated patches, based on predetermined criteria. Once found the stale image patch is preferably removed and an updated image patch is inserted in its place.).

Figure 3:
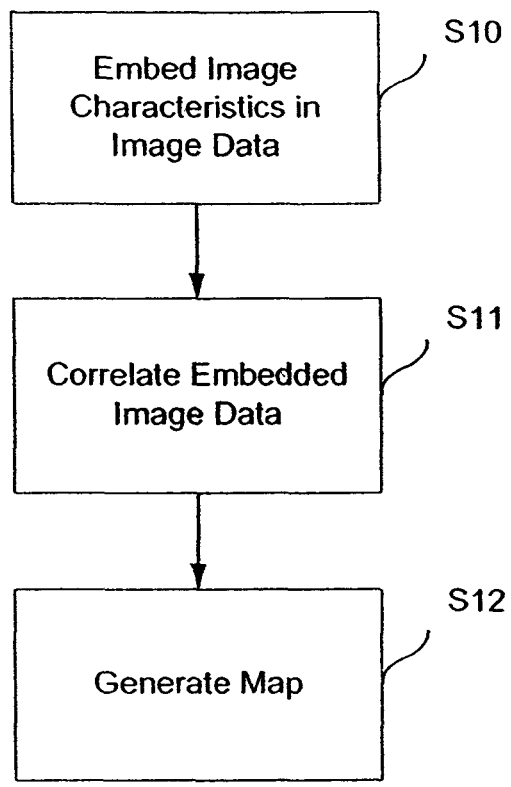
FIG. 3 is a flow diagram illustrating an image management method according to one aspect of the present invention.

FIG. 3 illustrates a flow diagram of an inventive method according to one embodiment of the present invention. Image data is received into a system or process. The image data is embedded with image characteristics (step S10). Alternatively, the image is embedded with an identifier (index) for database interrogation. The embedded image data is then correlated or manipulated to conform to adjacent patches or to map requirements (step S11). In this regard, the correlation may either render adjacent patches to have approximate (e.g., similar or in a range of) imagery characteristics, or to have nearly identical imagery characteristics. Or the correlation may group neighboring patches into a set. A map is then generated or constructed (S12). (A map can be quilted together to include many image patches. The digital watermark identifiers are used to correlate the image.).

Geo-Locators and Digital Watermarks

Digital watermarking is now disclosed as a central element in a digital asset management system, particularly for photograph assets (including "digital images"). Copyright labeling, active copyright communications, marketing links, etc., have been explored in the watermark art. This section discloses how digital watermarking (and related database linking properties) and georeferenced photography inter-relate. In one embodiment, digital watermarking is used as a platform to simplify and transform georeferenced photography.

Within the universe of subject matter for photography is what is broadly referred to as "remote sensing." For this discussion, remote sensing is defined to include all types of photography, which somehow images the Earth's surface or its landscape. Of course, while remote sensing may be facilitated with aerial platforms, such is not required. Add to the remote sensing class, all photography, which somehow has an innate connection to a location on the Earth—referred herein as "georeferenced photography." In the final analysis, virtually all photographs, one way or another, have innate geographic properties. (Even purely synthetic images are created by an author located "somewhere."). Most photographs, including swept-scan satellite imagery and radar, also including vacation snaps at, e.g., Niagara Falls, can be described as having innate, if not explicit, geographic properties. "Time" can also be included as an identifying property. (To simplify the discussion, the terms photograph, image, and photography are used interchangeably hereafter. Such terms may include remote sensing, georeferenced photography, image, imagery, photos, electronic images or imagery and/or aerial photo, etc., etc.).

Virtually all images can be referenced by a dimensional location vector (e.g., a "geovector") relative to the Earth's coordinate system. In a first embodiment, the geovector is presented as a six (6) element vector, including:

Latitude;
Longitude;
Height/Altitude (e.g., as compared to a mean-sea level sphere with an arbitrary time origin);
Time (including date);
Cardinal Direction; and
Azimuth.

The cardinal direction and azimuth elements can be used to determine a viewpoint depicted in a photograph (e.g., the azimuthal direction of a viewpoint for a given geo-position.).

In a modification, cardinal direction and azimuth indicate the vantage point of the imaging sensor. In still another modification, azimuth and cardinal direction are used to represent other directional indicators. Of course, the cardinal direction can be used to orient an image depicted in the photograph. (Although the term "geovector" is introduced in connection with a six (6) dimensional vector, the present invention is not so limited. Indeed, a geovector is defined broadly herein to include information conveying location and/or directional specifying data, regardless of vector size.).

In a modification to the first embodiment, a geovector includes "6+1" elements. The extra "+1" dimension can be multi-dimensional in nature, generally representing "sensor geometry." Sensor geometry is defined broadly herein to include a coherent set of optical (or electrical) sampling functions, e.g., corresponding to each pixel (or pixel block) and/or a microdensity region of a photograph. Of course, there is a variety of other types of sensor geometry, each associated with various rules on how the geometry is defined and how it affects the referencing parameters (e.g., latitude, longitude, height, etc.). A common form of sensor geometry is a rectangular fan or pyramid centered on a camera's aperture, which can be used as a stand-in for many others forms. Of course, there are many other geometry forms known to one of ordinary skill in the art, which are suitably interchangeable with the present invention.

The march of technological progress is transitioning more photography from the "innate" category to the "explicit" category through the use of global positioning system (GPS) technology and/or local wireless technologies. GPS can be used to determine a physical location (e.g., including properties of a geovector). As will be appreciated by those skilled in the art, GPS is a satellite-based radio navigation system capable of providing continuous position, velocity, and time information. GPS receiver units receive positioning signals from a constellation of satellites deployed in various orbits about earth (e.g., 12-hour orbits). The satellites continuously emit electronic GPS signals (or telemetry) for reception by ground, airborne, or watercraft receiver units. By receiving GPS signals from a plurality of satellites, a properly configured receiver unit can accurately determine its position in at least three dimensions (e.g., longitude, latitude, and altitude/height). Some GPS systems also provide compass-like functionality, in which cardinal direction and azimuth are determined. (Alternative methods can be used to determine a geovector. For example, many terrestrial-based stations emit navigational beacons that can be used to determine geo-location and relational-direction. Wireless systems may also be used to triangulate signals emitted from a mobile device. Such signals are collected at multiple receiving locations and based on the relative reception time and/or strength a geo-location is determined for the mobile device. Similarly, a mobile device can triangulate its position based on received beacons.).

The georeferencing techniques discussed above and in the incorporated by reference patents and applications can also be used to determine geovector information corresponding to a location depicted in a photograph. (E.g., a GPS or wireless system can provide geovector information. Or geovector information can be obtained from an image capture device, among the other techniques discussed.). In one embodiment, geovector data is obtained via an online (e.g., internet or network) database. A user simply enters in a street address or map-grid location, and the database returns corresponding geovector data (e.g., longitude, latitude, height, etc.). Or the geovector information is obtained from a user or agency based on human or computer analysis of an image. Artisans know other ways to determine and obtain geovector information. Of course, such other known techniques are suitably interchangeable with the present invention.

Beginning with the area of remote sensing, and extending to all photography with an innate geovector, digital watermarking is extended to embrace this fundamental set of information inherent in each and every photograph. Just as a "copyright" is fundamentally a part of every photograph, so too is a "geovector" a fundamental part of every photograph, and digital watermarking can expressly convey this geovector information.

Figure 4:
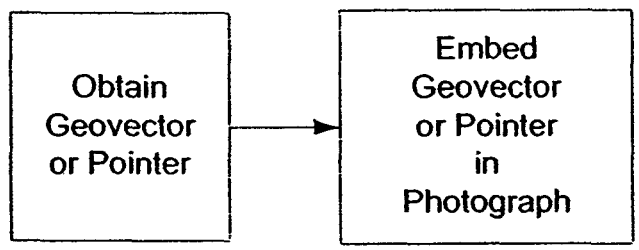
FIG. 4 is a flow diagram illustrating a method of embedding a geovector in image data including video.

Once obtained, a geovector is either contained in the embedded watermark information itself, or contained in a database to which the watermark represents a pointer, or both (see FIG. 4). Indeed, the geovector can be included in a watermark message or payload. In one embodiment, a watermark embedder performs error correction coding of a watermark's binary message (e.g., representing the geovector), and then combines the binary message with a carrier signal to create a component of a watermark signal. There are several error correction coding schemes that may be employed. Some examples include BCH, convolution, Reed Solomon, and turbo codes. These forms of error correction coding are sometimes used in communication applications where data is encoded in a carrier signal that transfers the encoded data from one place to another. In the digital watermarking application discussed here, raw bit data can be encoded in a fundamental carrier signal. It then combines the watermark signal with a host signal (e.g., a photograph). Further discussion for embedding messages can be found in assignee's U.S. patent application Ser. No. 09/503,881 (now U.S. Pat. No. 6,614,914), mentioned above. Artisans know other embedding techniques that are suitably interchangeable with the present invention.

Figure 5:
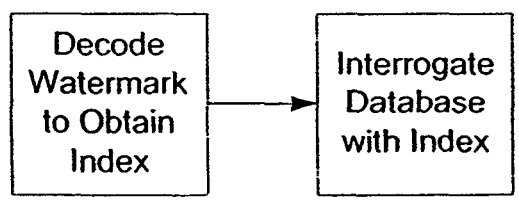
FIG. 5 is a flow diagram illustrating a method of decoding an embedded watermark to access a database.

A watermark embedded within a photograph may serve as (or carry) a database index or pointer. For example, the watermark includes an index, which once decoded, is used to interrogate a database (see FIG. 5). The database preferably contains data records including geovector information. The watermark index is used to identify a corresponding data record for the respective photograph (e.g., the photograph in which the watermark is embedded within). Of course, the database may be local or may be remotely accessed. In one embodiment, the watermark includes data corresponding to a URL or IP address, which is used to access a website. See Assignee's U.S. patent application Ser. No. 09/571,422 (now U.S. Pat. No. 6,947,571), mentioned above, for a further discussion of watermark-based linking. (The data may directly include the URL or may be used to access the URL.). A database associated with the website may be interrogated to retrieve the corresponding geovector information for a photograph. (In another embodiment, a watermarking reading device defaults to a URL or to an IP address, or queries a default database, upon detection of a watermark in a photograph.).

In yet another embodiment, geovector information is redundantly provided in header structures and watermark payloads.

Standardization efforts are currently underway, which are extending the idea of the geovector well beyond the examples presented above. See, for example, the Open GIS Consortium, an international consortium seeking to foster collaborative development of the OpenGIS Specifications to support full integration of geospatial data and geoprocessing resources into mainstream computing (http://www.opengis.org). (Of course, there are other known groups and companies focusing on geospatial and geographic information and services efforts. The "digital earth" concept is also known.). Such proposed standards have straightforward coordinate systems at their core.

We have determined that the standardization proposals lend themselves to conveying georeferencing in several different formats, including conveying information with digital watermarks, classic header structures, and pointer-to-elements in an associated database. Upon closer examination, however, we believe that our inventive digital watermarking techniques provide enhanced benefits when compared to these other techniques.

In today's world, where photography is rapidly becoming digital, a method of securely attaching identifying information (e.g., geovector information) to a corresponding photograph is needed. Digitally watermarking photographs provides a solution for the attachment problem. As discussed, a watermark may provide geovector information (or access to such information). A photograph many even be redundantly embedded with multiple copies of a watermark, further ensuring robust attachment of information to the photograph. Contrast our digital watermarking procedure with a procedure, which appends geovector information via headers. Whereas headers may be able to provide geovector information, they have a higher chance of separation from the underlying data—defeating a secure attachment feature.

Some of our inventive digital watermarking techniques involve a step of identifying a photograph (e.g., digitally watermarking a photograph with a binary identifier or a geovector) and, if using an index or identifier, storing information related to the index in some database or across a group of distributed databases. Adding a dimension of geovector information to the management of photographs results in a database or set of coordinated databases, which represent a searchable platform suitable for geographically based queries. The implications of such are tremendous. For example, a fisherman may search the database(s) for a photograph of a favorite fishing hole in Wyoming, based on a search criteria for a given time period, a range of time periods or by geo-location. The applications are endless—expanding far beyond dispelling fish stories. Friends of the fisherman may decode a watermark geovector or index embedded within the fisherman's watermarked photographs (e.g., by a compliant watermark reading device) to determine whether an area depicted in a photograph corresponds to a trout farm or to a high mountain lake—allowing "fish stories" to be verified. This information is readily available via a geovector associated with the image. The fisherman can maintain a photojournal of his fishing trips, knowing that the embedded watermarks provide sufficient information to help retrace his steps and travels. To aid this endeavor, digital cameras are envisioned to be equipped with watermark embedding software and geovector gathering modules such as GPS units. Or the geovector information can be added when images are stored in a database or processed after the fishing excursion.

Digitally watermarking photographs helps to provide a collision-free serial numbering system for identifying imagery, owners, and attributes.

There are additional benefits in creating a georeferenced system of images using digital watermarks. A classic notion in most standardizations across all industries is a notion of a "stamp" or "seal" or a similar concept of indicating that some object has successfully completed its appointed rounds. Call it branding, call it formality, or call it a soft form of "authenticity;" the historical momentum behind such a branding concept is huge. In one embodiment, to ensure that a given image is properly georeferenced (under a chosen standard), digitally watermarking the given image is a final step representing a formalized "seal of approval." The digital watermark itself becomes the seal. In one embodiment, a watermark identifier is obtained from an online repository, which issues and tracks authentic identifiers. The repository can be queried to determine the date and time of issue. Or the identifier can be linked to a seal or company logo. Software and/or hardware is configured to routinely read embedded digital watermarks and display an appropriate brand logo, seal, or certification. The "seal" itself then becomes a functional element of a standardization process, serving many functions including permanent attachment to standardized and dynamic metadata (e.g., a geovector).

Photographs by their very nature can be inter-processed, merged, split, cut up, etc., and so forth, as described in the prior art. This tendency is especially applicable to various geo-referenced imagery applications where some data sets are merged and viewed as derivative images. (See assignee's U.S. patent application Ser. No. 09/858,336, titled "Image Management System and Methods Using Digital Watermarks," filed May 15, 2001 (now U.S. Pat. No. 7,098,931), which is herein incorporated by reference.). Tracking image pieces is a daunting task. We have found that digital watermarks, in many such applications, are a good way of coordinating and keeping track of highly diverse image components. For example, an image is redundantly embedded with multiple copies of a watermark including a geovector for the image. When the image is cut up (or merged, etc.), each image piece preferably retains at least one of the redundantly embedded watermarks. The watermark is then decoded to identify the respective image piece, even when the piece is merged or combined with other image pieces.

A geovector may also provide sufficient information for stitching together map quilts, as discussed above, particularly if boundary or corner coordinates are provided. Instead of focusing on imagery characteristics, the map is quilted together based on the embedded geovector information.

The present invention includes many applications beyond identifying and associating data with photographs. Now consider embedding a digital watermark in a particular region of a map or photograph (e.g., corresponding to a location for a fire hydrant, tree, road, building, lake, stream, forest, manhole, water or gas line, park bench, geographical area, stadium, hospital, school, fence line, boarder, depot, church, store, airport, etc., etc.). These region-specific watermarks preferably include unique watermark payloads. A watermark payload conveys geovector information (or map coordinates) corresponding to its particular region of interest. (E.g., a geovector corresponding to a fire hydrant reveals the hydrant's location in latitude/longitude, etc. coordinates.). Now consider a modification in which, instead of uniquely watermarking individual map or photograph regions, a digital watermark is redundantly embedded throughout the map or photograph. In this modification, geovector information is conveyed via the redundant watermark payload for all fire hydrants's depicted on the map or photograph. Alternatively, instead of a payload conveying such geovector information, the payload comprises an index, which is used to interrogate a database to retrieve geovector information. (It should be appreciated that a fire hydrant is used for explanatory purposes only. Of course, other regions, structures, roads, land areas, bodies of water, buildings, etc. can be similarly watermarked.).

In another embodiment, a utility company watermarks a map or photograph to include geovector information corresponding to specific depicted objects, such as power stations, transformers and even transmission lines. Such information assists in locating areas for repair or inspection. Additional information can be stored in a database according to its geovector. For example, a power line's capacity, age, maintenance record, or rating can be associated in a database according to the line's geovector. Commonly assigned U.S. patent application Ser. No. 09/833,013, titled "Digitally Watermarked Maps and Signs and Related Navigational Tools," filed Apr. 10, 2001 (now U.S. Pat. No. 7,249,257), herein incorporated by reference, discloses various techniques for watermarking and reading maps. Such principles can be applied here as well. In another embodiment, a city, municipal, state or government agency digitally watermarks geovector location information on its maps and charts, corresponding to streets, country areas, buildings, manholes, airports, ports, water systems, parks, etc.

In another embodiment, school age children carry bracelets, book bags, tags, ID cards, shoelaces, or necklaces, etc., each watermarked with geovector information identifying their home, parents work address or school location. When lost, the preschooler presents her bracelet (or other object) to a police officer, school official, or automated kiosk. The embedded watermark is decoded to reveal the geovector information. The child's home or school, or a map route, can be identified from such.

Tags or collars for domestic animals or livestock can be geo-watermarked to assist in recovery when lost.

In still another embodiment, documents are embedded with geovector information. Consider embedding geovector data on a deed or property listing. Additional information regarding the property (e.g., title history, tax information, community information, recording information, photographs, etc.) is obtained via the geovector data link. For example, the additional information can be stored in (or referenced by) a database. The geovector data or other pointer serves as the index for the database.

Geovector information can also assist in notarizing (or authenticating) a document. Data is embedded in the document, which may indicate the document time (e.g., date and time) and location of creation (or execution). Upon presentment to a compliant watermark-reading device, the embedded data is extracted and read for verification.

In yet another embodiment, GPS or geovector information is embedded in video content. A watermark is embedded in each frame or every n frames. (Or a watermark can be embedded in a random or pseudorandom manner. Still further, a watermark can be embedded over multiple frames, so that successful watermark decoding requires analysis of the multiple frames.). Assignee's U.S. Pat. No. 6,122,403, and pending U.S. patent application Ser. Nos. 09/503,881 (now U.S. Pat. No. 6,614,914), 09/342,675 (now U.S. Pat. No. 6,400,827), 09/516,302 (now U.S. Pat. No. 6,449,379) and 09/872,199 (now U.S. Pat. No. 6,675,146) disclose suitable embedding techniques. Of course, other video watermark embedding techniques may be suitably interchanged with this aspect of the present invention so long as the alternative watermarks include sufficient data carrying capacity. For example, the Philip's Watercast™ system may be configured to embed GPS or geovector information. In one inventive implementation, a watermark is embedded to correspond with a video object (e.g., a depicted building, mountain, road, Coke can, etc., etc.). Assignee's U.S. patent application Ser. No. 09/597,209 (now U.S. Pat. No. 6,411,725) discloses suitable techniques for such object based embedding. Regardless of the embedding technique, the digital watermark preferably includes a payload or other information bits to carry or otherwise convey GPS or geovector information. Sometimes the payload includes a pointer which is used to link to GPS or geovector information.

In one implementation of this video embodiment, a video camera captures video. The video camera can be located in a warehouse, home, space shuttle or station, office, aircraft (manned or unmanned), factory, park, satellite, stadium, etc. Or the camera can be hand carried or mounted to say a car or helicopter. The video camera preferably includes or communicates with a GPS receiver. The GPS receiver preferably provides current location data to a digital watermark embedder. The embedder is integrated with or otherwise communicates with the video camera. The embedder embeds the location data in corresponding video frames as they are captured by the video camera. (In an alternative implementation, a video stream and GPS location data are communicated to a remote computer. The remote computer includes a digital watermark embedder to embed the video stream with the location data.). The GPS preferably provides updated location data to reflect location changes of the video camera and/or the camera's viewing perspective. We note that the video camera and/or the embedder can be synchronized to help ensure that the location data corresponds to the appropriate video frame or frames. Captured video is thus embedded with GPS information across time, e.g., the embedded GPS information changes as the camera/GPS location (or viewing area) changes over time. In a preferred implementation, geovector data is embedded so as to convey location information for areas depicted within a video frame. As geo-coordinates change across a video frame, so also a watermark payload varies across the frame in a respective manner.

In one aerial implementation of this video embodiment, location data embedded in a video frame corresponds to the frame center (or to another predetermined location, e.g., frame edge, or off-center frame location). For example, if the video platform includes an unmanned aircraft, the embedder may embed longitude and latitude of a location depicted in a video frame's center. A GPS receiver may also provide an altitude of the unmanned aircraft, which can be embedded in the frame, or used to determine the appropriate ground coordinates for the ground area depicted in the video or video frame. (We note that the altitude of the video capture platform is helpful in resolving off-center coordinates of other depicted video frame locations.).

In another implementation, embedded location information varies throughout a video frame. For example, an image frame is broken into blocks or shapes (e.g., polygon, circles, objects defined by edges, a pixel or group of pixels, etc.), and for each block or shape (or group of blocks or shapes) a watermark includes a unique identifier for that respective block or shape. In some implementations, the block or shape identifier includes geo-metadata such as ground coordinates, relative geo-position with respect to a fixed geo-position (e.g., a position or object depicted in the video frame is 17 kilometers North by Northwest of a fixed location), latitude and longitude, or a relative indicator of where the block or shape falls or is positioned within the video frame.

Figure 6:
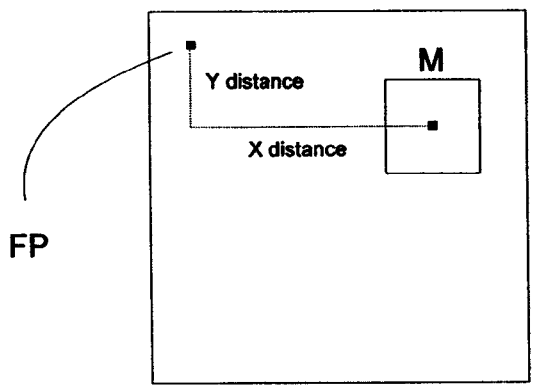
FIG. 6 shows a video frame including an object with respect to a reference point.

For a relative frame indicator, the watermark identifier for an object or shape may include an XY spatial position (or other coordinate unit) relative to the frame itself or to a fixed point(s) within the frame. With reference to FIG. 6, object M includes a watermark embedded therein including such an indictor, e.g., a value representing a distance as an amount of pixels from a fixed point FP to the center of the object M. The indicator could additional convey boundary or edge information for object M relative to the center of the object or relative to the fixed point FP. The ground coordinates associated with object M can be determined when the ground coordinates of the fixed point FP are known and the distance/per pixel (or other image/frame information) for the frame is known.

In still another implementation, an automated controller monitors a GPS unit (or mapping model) to determine when captured video corresponds to a predetermined location. The controller activates a watermark embedder to embedded a watermark within the video once the captured video corresponds with the predetermined area. The watermark includes an identifier to indicate that the video corresponds with the predetermined area. (The presence of the watermark identifier signals the predetermined location without the need of geo-coordinates.) This implementation is useful to reduce searching time to find a specific geographic area, since searching for the digital watermark readily identifies the predetermined location within a video segment. To illustrate, consider a Cessna aircraft that takes off from a private airstrip in French Guiana. The Cessna's mission is to videotape a fire burning in a predetermined location in a rain forest. The Cessna includes a video camera, controller, digital watermark embedder and GPS unit. The controller receives signals from the GPS unit and, when the GPS data indicates that the Cessna has reached the predetermined location (e.g., the fire line), actives the watermark embedder. The watermark embedder embeds a digital watermark at a specific video frame in the captured video. The watermark embedder can continue to embed the identifier so long as the plane or video captured from the video camera corresponds with the predetermined location. The video is examined after the Cessna returns to the airstrip. The presence of a watermark identifier through the sequence of video frames can be used to identify the predetermined location; the absence of the watermark identifier can be used to signal that the unmarked video does not depicted the predetermined location. Or, a second watermark (or different watermark component) can be used to signal the end of the predetermined location. Of course, multiple watermarks (e.g., with different identifiers) can be used within a video sequence to identify a plurality of different predetermined locations.

(In a related implementation dealing with images, a watermark is embedded in an image or image area to indicate that a depicted area corresponds to a predetermined area. A plurality of images can be searched (e.g., analyzed for watermarks embedded therein) to find the expected watermark. Once found, the corresponding image is deemed to depict the predetermined location. In an audio implementation, a digital watermark is embedded in audio to correspond with audio captured at a specific location. The watermark may optionally include location data such as a geovector.).

In still another implementation, a watermark is used as an odometer of sorts. A watermark is inserted throughout a video sequence. The watermark varies (e.g., increments) in time across captured frames. (For example, the watermark payload or identifier varies with time.) The identifier preferably corresponds with airspeed of the aerial platform or relates a function of airspeed, altitude of aerial platform and/or flight plan, etc. The watermark identifier can be used to determine a position of a depicted area in video frame relative to a starting point or flight path.

Figure 7A:
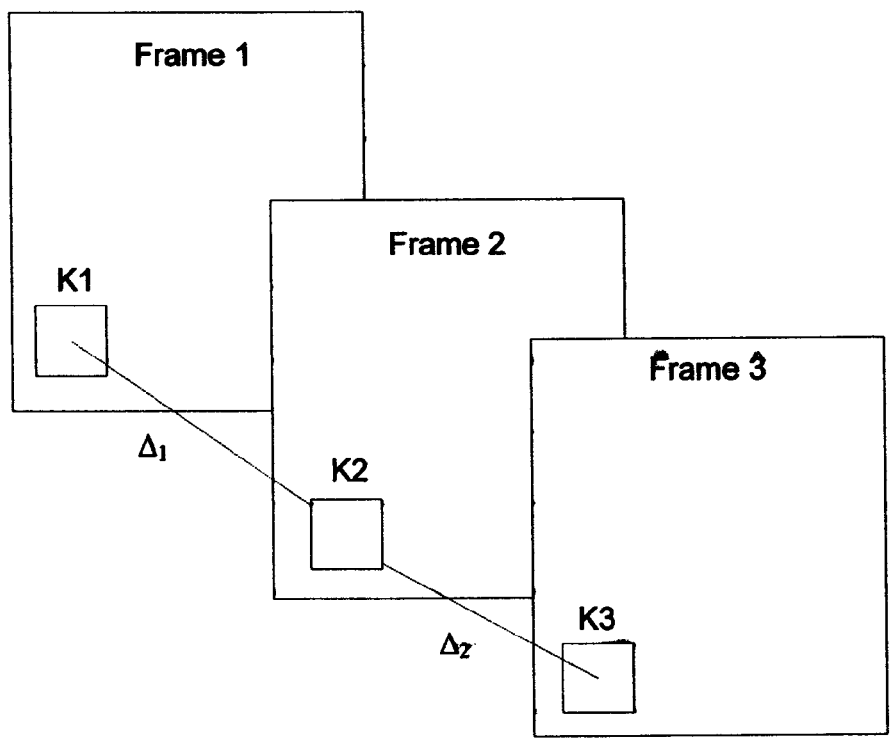
FIG. 7a shows a plurality of video frames including embedded data.

A further embodiment is disclosed with reference to FIG. 7a. A plurality of video frames (1, 2, 3) each include a region K1, K2 and K3, respectively. Video frames 1, 2 and 3 were captured from a moving aerial platform, and need not be adjacently arranged in a video sequence. Regions K1, K2 and K3 each depict a different ground location. (If the aerial platform is moving slowing, the difference between these regions may be subtle.) The regions occupy the same spatial frame position relative to one another as shown. Region K1 includes a first digital watermark W1 embedded therein. The first watermark W1 includes a first payload P1 that provides a base indication (e.g., coordinates) for the ground area depicted in K1 (perhaps a center location or boundary, etc.). In some implementations the indication is an identifier that can be used to access a data record including the ground coordinates. Region K2 includes a second digital watermark W2 embedded therein. The second watermark W2 includes a second payload P2. Instead of providing the actual coordinates for the depicted area, however, payload P2 includes a representation of the change ($\Delta_1$) in ground coordinates between K1 and K2. For example, the change may be represented in terms of geovector differences, miles, in latitude/longitude differences, in terms of predetermined map coordinates, etc. Similarly, region K3 includes a payload P3 which represents a change ($\Delta_2$) in geo-location between the area depicted in K3 and the area depicted in region K2 (or between K1). Of course, the respective ground coordinates (and changes in coordinates) can be determined in real-time by a watermark embedder in communication with a GPS and/or aerial platform information (e.g., altitude, angle of video capture, flight speed, etc.). Or the embedding may occur later, perhaps after some human analysis of the captured video.

Figure 7B:
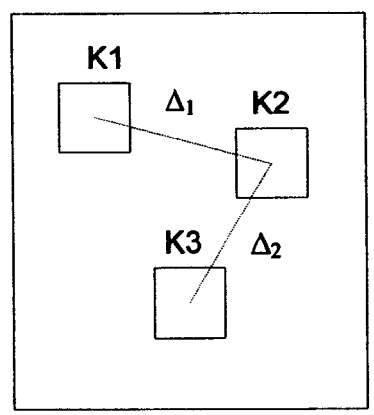
FIG. 7b is an image including multiple areas.

A similar technique can be used within a video frame or image, as shown in FIG. 7b. Here, regions K1, K2 and K3 represent separate (perhaps even overlapping) areas or blocks within an image. Each region includes a watermark embedded therein. The watermarks include payloads. Payload P1 includes a base indication for the ground coordinates associated with the area depicted in region K1. As discussed above, payload P1 can physically carry this information or can provide a link to a data record including the ground coordinates. Region K2 includes a second digital watermark having a payload P2. Instead of conveying the actual ground coordinates for the area depicted in region K2, the payload P2 preferably conveys a change of the ground coordinates for the area depicted in region K2 in comparison to the ground coordinates depicted in K1. Similarly, a watermark payload P3 embedded in region K3 includes a change or difference in ground coordinates with respect to the ground coordinates of the area depicted in region K2 (or K1).

Of course, other geovector information (e.g., time/date, cardinal direction, sensor geometry, and/or azimuth, etc.) can be embedded in video as well, along with camera characteristics such as resolution, optics characteristics, etc. Also, as with other content discussed above, a geovector can include or be replaced with a pointer. The pointer can be used to access a database to retrieve the geovector coordinates. Also, the geovector can be used as a backbone (or as a persistent identifier) in a video management system. Video segments or video frames are indexed in a database according to their geo-location.

In yet another embodiment, geovector information is the common factor, which binds information together. For example, information is stored according to its geovector information (e.g., according to creation geo-location, subject matter geo-location, ancillary relationship to a geo-location, etc.). Database searching for information is carried out via the geovector data. To illustrate, the database is searched for all information pertaining to a specific geo-vector (e.g., the Washington Monument). All data (or a subset of the data) pertaining to the geovector (e.g., the Washington Monument) is returned to the user. The data can include reports, web pages, maps, video and audio clips, pictures, statistical data, tourist information, other data, musings, related sonnets, governments information, just to name a few.

These are just a few embodiments and examples employing digital watermarking of geovector data. There are many other applications, which fall within the scope of the present invention.

CONCLUSION

The foregoing are just exemplary implementations of the present invention. It will be recognized that there are a great number of variations on these basic themes. The foregoing illustrates but a few applications of the detailed technology. There are many others.

For example, digital watermarks can be applied to any data set (e.g., a satellite image, video or a map generated from the master database) for forensic tracking purposes. This is particularly useful where several copies of the same data set are distributed through different channels (e.g., provided to different users). Each can be "serialized" with a different identifier, and a record can be kept of which numbered data set was provided to which distribution channel. Thereafter, if one of the data sets appears in an unexpected context, it can be tracked back to the distribution channel from which it originated.

Some watermarks used in the foregoing embodiments can be "fragile." That is, they can be designed to be lost, or to degrade predictably, when the data set into which it is embedded is processed in some manner. Thus, for example, a fragile watermark may be designed so that if an image is JPEG compressed and then decompressed, the watermark is lost. Or if the image is printed, and subsequently scanned back into digital form, the watermark is corrupted in a foreseeable way. (Fragile watermark technology is disclosed, e.g., in application Ser. Nos. 09/234,780, 09/433,104, 09/498,223, 60/198,138, 09/562,516, 09/567,405, 09/625,577, 09/645,779, and 60/232,163. Each of these patent applications is herein incorporated by reference.) By such arrangements it is possible to infer how a data set has been processed by the attributes of a fragile watermark embedded in the original data set.

Certain "watermark removal" tools can be built to alleviate visibility or processing problems in cases where unacceptable impact of a digital watermark is identified. This can either be a generic tool or one highly specialized to the particular application at hand (perhaps employing secret data associated with that application). In another embodiment, a "remove watermark before analyzing this scene" function is included within analysis software such that 99% of image analysts wouldn't know or care about the watermarking on/off/on/off functionality as a function of use/transport.

As will be apparent, the technology detailed herein may be employed in reconnaissance and remote sensing systems, as well as in applications such as guidance of piloted or remotely piloted vehicles. Once identified from a map or photograph, geovector data can be uploaded to such vehicles.

To provide a comprehensive disclosure without unduly lengthening this specification, applicants incorporate by reference, in their entireties, the disclosures of the above-cited patents and applications. The particular combinations of elements and features in the above-detailed embodiments are exemplary only; the interchanging and substitution of these teachings with other teachings in this application and the incorporated-by-reference patents/applications are expressly contemplated.

It should be understood that the technology detailed herein can be applied in the applications detailed in the cited DEM patents, as well as in other mapping and image, audio or video contexts as well. (Likewise, the technologies detailed in the cited patents can be advantageously used in embodiments according to the present invention.)

While a geovector is described above to include, e.g., "6+1" dimensions, the present invention is not so limited. Indeed, a geovector can include more or less vector elements, depending on the referencing precision required. (To illustrate, altitude may be immaterial when other geovector coordinates are provided. Or a camera sensor geometry (e.g., "+1") element may not be needed to uniquely identify a location or to account for sensor geometry. Alternatively, a map identifier or locator can be included to achieve similar functionality instead of a geovector. In other cases, where only rough referencing information is needed, providing only longitude and latitude coordinates may be sufficient. Of course, in the event that geospatial or geography information and services standards are formalized and/or updated, the geovector can be formatted to include the reference locators described in that standard. Similarly, instead of a geovector, geo-coordinates or other location information can be provided via a watermark or watermark index. The term "geovector" is sometimes broadly used herein to encompass these alternatives.).

There are many embodiments discussed herein which may benefit from the inclusion of two different watermarks. For example, a first watermark may include information regarding (or pointing to) geovector information, while a second watermark includes a database identifier or location. The second watermark may alternatively include (or point toward) information pertaining to events, people or animals identified in the photograph, occasions, groups, institutions, copyright ownership, etc. Or the embodiment may include both a robust geovector watermark and a copy-tamper fragile watermark.

While particular reference was made to Digital Elevation Models and albedo maps, the same principles are likewise applicable to other forms of maps, e.g., vegetative, population, area, thermal, etc., etc.

While one of the illustrated embodiments correlated incoming imagery with a projective image based on the master DEM/map, in other embodiments a reference other than the master DEM/map may be used. For example, a projection based just on part of the historical data from which the DEM/map was compiled can be used (e.g., one or more component data sets that are regarded as having the highest accuracy, such as based directly on ground truths).

Although not belabored, artisans will understand that the systems described above can be implemented using a variety of hardware and software systems. One embodiment employs a computer or workstation with a large disk library, and capable database software (such as is available from Microsoft, Oracle, etc.). The registration, watermarking, and other operations can be performed in accordance with software instructions stored in the disk library or on other storage media, and executed by a processor in the computer as needed. (Alternatively, dedicated hardware, or programmable logic circuits, can be employed for such operations.).

Certain of the techniques detailed above find far application beyond the context in which they are illustrated. For example, equipping an imaging instrument with an optical shutter that imparts a watermark to an image finds application in digital cinema (e.g., in watermarking a theatrical movie with information indicating the theatre's geo-location, date, time, and/or auditorium location for a given screening).

The various section headings in this application are provided for the reader's convenience and provide no substantive limitations. The features found in one section may be readily combined with those features in another section.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
obtaining geocoordinates representing several different geo-locations; and
embedding the geocoordinates in video depicting the several different geo-locations with digital watermarking, wherein each of the digital watermarks associated with each geocoordinate is spatially aligned within the video so as to be within a region of a video frame that corresponds to the respective geo-location.

2. A method comprising:
selecting a geo-location;
recording video of different geo-locations including the selected geo-location, wherein the video is recorded by an airborne platform;
monitoring a current geo-location of the airborne platform; and
initiating embedding of digital watermarking in the video when the current geo-location corresponds to the selected geo-location, wherein the presence of the digital watermarking without reference to content of the digital watermarking at a particular location in the video identifies the selected geo-location.

3. A method of digital watermarking video, the method comprising:
steganographically hiding a first, plural-bit payload in data representing a first video portion, wherein the first, plural-bit payload is associated with at least one or more ground coordinates associated with the first video portion; and
steganographically hiding a second, plural-bit payload in data representing a second video portion, wherein the second, plural-bit payload is associated with a difference between one or more ground coordinates associated with the second video portion and the one or more ground coordinates associated with the first video portion.

4. A method to identify video, wherein the video comprises a first video frame captured from an aerial platform, the method comprising:
steganographically embedding data in the first video frame, wherein the data comprises first location data corresponding to at least a first location depicted in the first video frame and second location data corresponding to at least a second location depicted in the first video frame, wherein the first location data differs from the second location data, wherein the steganographic embedding comprises alterations to the video that are generally imperceptible to a human viewer of the video, and wherein the second location data comprises finely referenced location data relative to the first location data.

5. The method of claim 4, wherein the first location data and the second location data each comprise at least longitude and latitude coordinates.

6. The method of claim 4, wherein the first location data and the second location data each further comprise time data and at least one of altitude of the aerial platform at video capture or video capture angle.

7. The method of claim 4, wherein the first location data and the second location data respectively correspond to at least one of a first location of the aerial platform or a first aerial platform viewing perspective, and a second location of the aerial platform or a second aerial platform viewing perspective.

8. The method of claim 2, further comprising initiating embedding of different digital watermarking in the video captured by an airborne platform to indicate an end of the selected geo-location.

9. The method of claim 2, wherein the digital watermarking is limited to portions of the video which correspond to the selected geo-location.

10. The method of claim 9, wherein an absence of the digital watermarking in some portions of the video indicates that such portions of the video does not depict the selected geo-location.

11. The method of claim 2, further comprising
selecting a second geo-location;
initiating embedding of a second digital watermarking in the video when the current geo-location corresponds to the selected second geo-location, wherein the presence of the second digital watermarking at a particular location in the video identifies the selected second geo-location, and wherein the selected second geo-location is identified within the video without reference to content of the digital watermark.

12. The method of claim 1, wherein at least two geocoordinates are embedded in different regions of a video frame.

13. The method of claim 1, wherein the geo-locations comprise one or more locations of buildings, roads, and utility company equipment.

14. The method of claim 4, wherein the aerial platform comprises at least one of a satellite, helicopter, unmanned aircraft, space shuttle, or aircraft.

* * * * *

UNITED STATES PATENT AND TRADEMARK OFFICE
CERTIFICATE OF CORRECTION

PATENT NO. : 8,045,749 B2
APPLICATION NO. : 11/835142
DATED : October 25, 2011
INVENTOR(S) : Rhoads et al.

It is certified that error appears in the above-identified patent and that said Letters Patent is hereby corrected as shown below:

Title page, item (57), under "Abstract", in Column 2, Line 3, delete "geolocation" and insert -- geo-location --.

Column 1, line 6, delete "Ser. No. 10/371,995 (now U.S. Pat. No. 7,254,249)," and insert -- Ser. No. 10/371,995, filed Feb. 20, 2003, (now U.S. Pat. No. 7,254,249), --.

Column 22, line 1, in Claim 11, delete "comprising" and insert -- comprising: --.

Signed and Sealed this
Twenty-ninth Day of May, 2012

David J. Kappos
*Director of the United States Patent and Trademark Office*